United States Patent [19]

Ceintrey

[11] 4,171,980

[45] Oct. 23, 1979

[54] PHOTOSENSITIVE COMPOSITIONS AND RECORDING MATERIALS AND PROCESSES UTILIZING SAME

[75] Inventor: Claude G. Ceintrey, Neuville Les Dieppe, France

[73] Assignee: La Cellophane, Paris, France

[21] Appl. No.: 866,346

[22] Filed: Jan. 3, 1978

Related U.S. Application Data

[62] Division of Ser. No. 676,872, Apr. 14, 1976, abandoned.

[30] Foreign Application Priority Data

Apr. 24, 1975 [FR] France ................................ 75 12750
Apr. 28, 1975 [FR] France ................................ 75 13161

[51] Int. Cl.$^2$ ........................ G03C 5/24; C09D 11/00

[52] U.S. Cl. .................................... 96/48 R; 428/913; 428/327; 106/21; 96/90 PC

[58] Field of Search ............. 96/48 R, 48 HD, 90 PC, 96/27 R, 27 E; 428/913, 327; 106/21; 250/316

[56] References Cited

U.S. PATENT DOCUMENTS

| | | | |
|---|---|---|---|
| 3,320,067 | 5/1967 | Taylor | 96/90 PC |
| 3,341,330 | 9/1967 | Foris | 96/90 PC |
| 3,441,411 | 4/1969 | Amidon et al. | 96/90 PC |
| 3,451,338 | 6/1969 | Baum | 96/90 PC |
| 3,486,899 | 12/1969 | Brown | 96/90 PC |
| 3,667,949 | 6/1972 | Inoue et al. | 96/90 PC |
| 3,700,440 | 10/1972 | McLeod et al. | 96/90 PC |
| 3,761,942 | 9/1973 | Lorenz et al. | 96/90 PC |
| 3,785,820 | 1/1974 | Inoue et al. | 96/90 PC |

*Primary Examiner*—Won H. Louie, Jr.
*Attorney, Agent, or Firm*—Sherman & Shalloway

[57] ABSTRACT

A photochromic spiropyran compound is uniformly dispersed in a vinyl chloride homopolymer or copolymer resin binder. The resulting photosensitive composition provides an image which is highly stable against exposure to light, darkness, and heat when the composition is exposed to a light source emitting radiation of wavelength which includes the absorption band of the spiropyran compound.

By incorporating polyvinylidene chloride in the photosensitive composition a positive reproduction of an original can be obtained by a dry photographic process in which the photosensitive composition is first irradiated through an original to form a stable pale yellow complex between hydrochloric acid produced by decomposition of the polyvinylidene chloride and the merocyanine produced from the photoisomerization of the spiropyran compound and thereafter again irradiating the entire photosensitive composition to form a stable colored complex in the areas which were not originally exposed which correspond to the opaque area of the original.

A photothermal development process is accomplished with a composition which includes the photochromic spiropyran compound, the polyvinyl chloride binder and at least one additional material selected from hydrolyzed polyvinyl alcohol, hydroxyethyl cellulose, or carboxymethyl cellulose.

9 Claims, No Drawings

PHOTOSENSITIVE COMPOSITIONS AND RECORDING MATERIALS AND PROCESSES UTILIZING SAME

This is a division of application Ser. No. 676,872, filed Apr. 14, 1976, now abandoned.

BACKGROUND OF THE INVENTION

1. Field of Invention

The present invention relates to photosensitive compositions which provide highly stable colored images and to processes for preparing colored images utilizing the same. More specifically, the present invention relates to a photosensitive composition capable of dry development solely by exposure to actinic radiation or by a combination of exposure to actinic radiation and thermal development wherein either positive or negative prints can be produced.

2. Discussion of the Prior Art

Photochromic compounds and compositions that change color or intensity when exposed to light, have long been used in light sensitive photographic compositions. On exposure to light of certain wavelengths the photochromic compound undergoes a reversible color change; i.e. it becomes colored under the influence of light of certain wavelengths, whereas upon irradiation with other, usually longer wavelengths, it exhibits a tendency to revert to the colorless state. The colored images of photochromic materials also exhibit a tendency to revert to the colorless state when left in the dark or when exposed to heat.

The reversibility of the color change of photochromic compounds and compositions have been taken advantage of in various photographic or photolithographic processes. For instance, British Pat. No. 1,154,716 to Minnesota Mining and Manufacturing and U.S. Pat. No. 3,804,628 to Fuji Photo Film Company, LTD, take advantage of the transient nature of the colored image formed upon light exposure of a photochromic compound which is incorporated in photosensitive compositions containing photohardenable polymers for the preparation of lithographic plates, in order to have positive means of identifying the exposure of the photosensitive composition. In such applications the reversibility of the color forming reaction is either advantageous or at least is not disadvantageous. As noted in both of these patents a particularly preferable class of photochromic compounds are the spiropyran compounds such as the indolino spirobenzopyran derivatives. These compounds are well known in the prior art and have been fully described in such publications as "Advances in Photochemistry", volume 1, page 275ff, New York, Intersciences, 1963. Briefly, when the photochromic spiropyran compound is exposed to a source of ultraviolet radiation having a wavelength less than about 4200 Å, a bond is broken and the compounds are transformed from their colorless form to the corresponding merocyanine compound, a colored form. However, the colored form is reversible and disappears upon exposure to visible light, darkness, or heat.

Naturally, the reversibility of the color change of the photochromic compounds has prevented the use of such substances in photographic compositions and photographic processes wherein it is desired to produce a permanent image. Accordingly, the prior art has developed several approaches to provide permanent colored images utilizing photochromic compounds and specifically photochromic spiropyran compounds.

For instance, Delzenne, in U.S. Pat. No. 3,730,734 describes a light sensitive photographic material comprised of a photochromic spiropyran compound and a photohardening polymeric system. Exposure of the photographic material to actinic light produces cross-linking of the photohardening polymeric systems which react with and "lock" the photochromic compound in its colored form.

It has also been proposed, for example, to form permanent color images by combining the spiropyran compound with a phenol compound. For example, Baum in U.S. Pat. No. 3,451,338 describes a thermographic method of data-recording and heat-sensitive record sheets which include chromogenic indolino-spirobenzopyran compounds and a di-phenol material which produce immediate and lasting color when and where the two co-reactant materials are brought into liquid contact, as in a melt. It has also been proposed to form permanent color images with the indolino-spirobenzopyran and other photochromic materials by locking the colored form by means of heat or metallic salts.

However, the development of these processes has not been simple and the colored images have not proven to be permanently irreversible. For instance, when phenol compounds are used the presence of untransformed phenols tend to produce a disagreeable heightening of the color resulting from the oxidation by air of the untransformed phenols to give colored quinone compounds.

French Pat. No. 1,478,155 discloses a process of selective masking, i.e. a process whereby a positive is produced from a negative wherein the variations of density of the negatives are attenuated. In this process it is suggested to use an intermediary recording material formed from a transparent support sheet coated with a spiropyran dispersed in from between 5 and 50% of hydrolyzed vinyl acetate as a binder. However, the colored form produced in this process is still only temporary, which, however, is acceptable for the overall selective masking process.

Berman in U.S. Pat. Nos. 3,072,481 and 3,090,687 describes photochromic recording materials which utilize specific photochromic spiropyran compounds which are substantially inert to color changes when in the dry and solid form. These compositions attempt to fix the colored image by dissolving the spiropyran compounds in volatile solvents which evaporate after the color has formed to leave the untransformed photochromic spiropyran compound in the dry and solid form. However, the use of volatile organic solvents is clearly objectionable with regard both to safety considerations and complex equipment requirements.

Cerreta in U.S. Pat. No. 3,212,898 describes polyester resins in which photochromic spiropyran compounds are uniformly dispersed. It was found that the photochromic properties of the spiropyran compounds was not blocked in the solid polyester resin although it was previously generally supposed that the photochromic spiropyran compounds only exhibited their photochromism when in solution. However, the reversibility of the color change was not inhibited by the solid polyester resin solutions of the photochromic compound. Thus, Cerreta teaches that the products may be transformed back to their true color from the color attained by contact with ultraviolet light by removing the exposed compositions from the light for a short period of time.

As previously mentioned the photochromic properties of spiropyran compounds has found application in lithographic printing processes wherein advantage is taken of the immediate color change upon exposure to a suitable light source. In these processes the creation of a visible image by the formation of the colored form of the spiropyran compound is taken as an indication of appropriate exposure of the lithographic plate so that the latent image may subsequently be exposed without having to worry about double exposure or other problems prevalent in the lithographic printing process. Examples of this type of application can be found in the aforementioned U.S. Pat. No. 3,804,628 to Osada et al and British Pat. No. 1,154,716 to Minnesota Mining and Manufacturing Company. The compositions described in these patents are basically conventional lithographic compositions which include oleophilic water-insoluble, solvent-softenable, photohardenable resins in which the photochromic compound is dispersed. For instance, in Example 1 of the British patent a resin millbase includes ethylene dichloride, polyvinylformal resin and epoxy resin. In Example 3 of the British Patent the coating solution composition includes methyl ethyl ketone, vinyl chloride-vinyl acetate-maleic anhydride terpolymers, methyl methacrylatestyrene copolymer, diazoformaldehyde resin and diacetone alcohol. In Example 5 of the British patent polyvinyl cinnamate is used in a photoresist solution.

The Osada et al patent describes photosensitive compositions wherein a photochromic indolino-spirobenzopyran derivative and a sensitizer is combined with a photosensitive resin having a cinnamoyl group, a beta-(2-furyl) acryloyl group or a beta-(pyridyl) acryloyl group as side chains. The photosensitive resins containing the aforementioned side groups may be in the form of homopolymers or copolymers. Other components of the copolymers utilized in these compositions include styrene and derivatives thereof, (meth)acrylic acid or esters thereof, acrylamide, (meth)acrylonitrile, vinyl chloride, vinyl acetate, β-hydroxymethylmethacrylate, N-methylolacrylamide, glycidyl methacrylate, γ-chloro-β-hydroxypropyl methacrylate, glycerol acrylate, and glycerol methacrylate. These materials are used at levels of from 2 to 35% by weight based on the total amount of the polymer.

However, none of these previously described compositions containing photochromic spiropyran compounds have been completely successful in forming permanent colored images in a dry development process.

SUMMARY OF THE INVENTION

The present invention discloses photosensitive compositions and recording elements and processes utilizing the same which overcome these drawbacks of the prior art. The photosensitive compositions of the present invention are capable of producing colored images which are stable against exposure to light, darkness, and heat. Briefly, the compositions of the present invention include specific photochromic spiropyran compounds selected from indolino-spirobenzopyran compounds, benzothiazole spirobenzopyran compounds, oxazolidine spirobenzopyran compounds and thiazoline spirobenzopyran compounds uniformly dispersed in polyvinyl chloride homopolymer or copolymer as a binder. When a vinyl chloride copolymer is utilized it is essential that at least 50% by weight of the copolymer is based on vinyl chloride monomer units. A photosensitive recording element, e.g. photosensitive recording paper is prepared by forming a layer of the photosensitive composition on a suitable support material, e.g. paper.

The photosensitive recording element is used in a process for producing a color image according to a predetermined pattern by exposing the layer of the photosensitive composition to a light source emitting radiation having a wavelength which is in the absorption band of the particular photochromic spiropyran compound such that a colored image will be formed in the exposed areas of the photosensitive recording element according to the predetermined pattern. As used herein the terms "predetermined pattern" or "image-wise exposure" is intended to include, for example, exposure through a stencil or transparency having opaque areas and transparent areas as well as exposure by a narrow light beam such as in the recording of data points, etc.

The spiropyran compounds which have been found to be stabilized when transformed to the colored form, i.e. merocyanine compound, when dispersed in a vinyl chloride resin binder and are therefore useful in the photosensitive compositions, photosensitive recording elements, and photographic processes of the present invention include the indoline-spirobenzopyran compounds having the following formula:

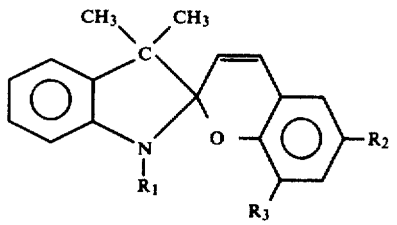

in which $R_1$ is an alkyl group, preferably of 1 to 10 carbon atoms or a phenyl group $R_2$ is H, OH, Cl, Br, $NO_2$, methoxy or ethoxy and $R_3$ is H, Cl, Br, $NO_2$, methoxy or ethoxy;

and benzothiazole spirobenzopyran compounds having the following formula:

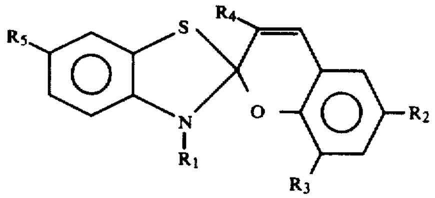

in which $R_1$, $R_2$, and $R_3$ have the same meaning as above, and in which $R_4$ in alkyl, phenyl, alkoxy, phenoxy or thioalkyl, wherein the alkyl, alkoxy and thioalkyl groups can have from 1 to 20 carbon atoms; and $R_5$ is H, alkyl of 1 to 10 carbon atoms, methoxy or thiomethyl; oxazolidine spirobenzopyran compounds having the following formula:

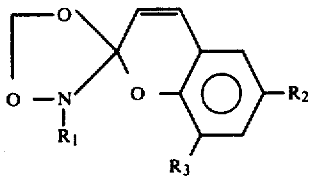

wherein $R_1$, $R_2$, and $R_3$ are as defined above; and thiazoline spirobenzopyran compounds of the following formula:

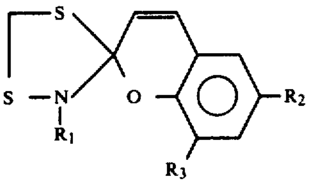

wherein $R_1$, $R_2$, and $R_3$ are as defined above.

These spiropyran compounds are converted to merocyanines by the action of actinic radiation, i.e. ultraviolet radiation having a wavelength whose order of magnitude is between about 2,000 Å to about 4,000 Å.

The present invention also provides photosensitive compositions and photosensitive recording elements which are capable of producing positive colored reproductions on a pale stable yellow background of an original transparency. In these compositions which utilize the same photochromic spiropyran compounds as described above a portion of the vinyl chloride resin binder is replaced by polyvinylidene chloride or a separate layer of the polyvinylidene resin is formed on the photosensitive recording element.

Accordingly, the present invention also provides a process for producing a positive colored reproduction of an original transparency wherein a layer or layers of the photosensitive composition containing the photochromic spiropyran compound and the vinyl chloride resin binder and polyvinylidene chloride, on a suitable support, is first exposed to ultraviolet actinic radiation having a relatively short wavelength which causes the decomposition of the polyvinylidene chloride to produce hydrochloric acid and conversion of the spiropyran compound to merocyanine which will provide for the formation in the irradiated zones of the photosensitive recording element of a pale stable yellow complex between the hydrochloric acid and the merocyanine. After the original has been removed from the exposed recording material the recording element is again exposed to ultraviolet radiation having a wavelength which is in the absorption band of the spiropyran compound whereby a stable colored complex of the merocyanine and vinyl chloride resin binder is formed in areas corresponding to the opaque areas of the original transparency. In this embodiment of the present invention a strongly colored stable positive reproduction is formed on a pale yellow background. The photosensitive compositions and recording materials of this embodiment are advantageous in that the background as well as the recorded images remain perfectly stable with time.

On the otherhand, with the photosensitive compositions and recording materials of the first described embodiment, which does not include the polyvinylidene chloride, it is possible to reuse the previously exposed recording material to add additional images, e.g. drawings, letters, numbers, symbols, etc. on the unexposed background portion by re-exposing the recording material to the ultraviolet radiation. However, even if the previously exposed portions are inadvertantly re-exposed to the ultraviolet radiation the original images will not thereby be adversely effected.

In a further embodiment of the photosensitive compositions, recording elements and processes of the present invention the photochromic spiropyran compounds are converted to their stable colored form by an initial application of thermal energy followed by exposure to the action of ultraviolet radiation. In this embodiment wherein the same photochromic spiropyran compounds as described above are utilized a portion of the vinyl chloride resin binder is replaced by at least one member selected from the group consisting of polyvinyl alcohol, hydroxyethyl cellulose and carboxymethyl cellulose. The polyvinyl alcohol must have a level of hydrolysis of at least 70 mole percent.

Accordingly, the present invention also provides a photosensitive composition and recording element wherein a photochromic spiropyran compound is uniformly dispersed in a binder which includes at least 50% by weight of polyvinyl chloride homopolymer or copolymer and from 30 to 50% by weight of the binder of at least one of hydrolyzed polyvinyl alcohol (70 mole percent hydrolyzed), hydroxyethyl cellulose or carboxymethyl cellulose. The present invention also provides a photothermal process comprising the application of thermal energy according to a predetermined pattern to the photosensitive recording element to initiate the transformation of the photochromic spiropyran compound to its colored form and thereafter irradiating the photosensitive recording element with ultraviolet radiation to thereby amplify the transformation and stabilize the colored form. The thermal energy can be applied by any suitable means such as a thermal head, heated stylus or any other suitable means which will heat the photosensitive recording element until its temperature is raised to at least 120° and preferably 150° C.

DETAILED DESCRIPTION OF THE INVENTION

The photochromic spiropyran compounds which have been found to form permanent stable colored images upon exposure to actinic radiation when uniformly dispersed in a vinyl chloride resin binder include specific indoline-spirobenzopyrans, benzothiazole spirobenzopyrans, oxazolidine spirobenzopyrans, and thiazoline spirobenzopyrans. These compounds have the following formulas:

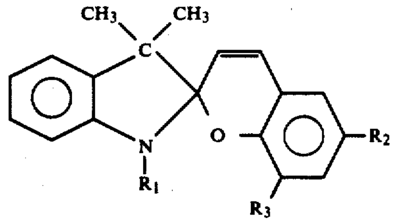

in which $R_1$ is an alkyl group, preferably of 1 to 10 carbon atoms or a phenyl group $R_2$ is H, OH, Cl, Br, $NO_2$, methoxy or ethoxy and $R_3$ is H, Cl, Br, $NO_2$, methoxy or ethoxy; benzothiazole spirobenzopyran compounds having the following formula:

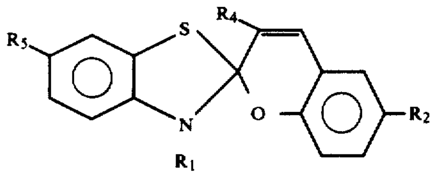

in which $R_1$, $R_2$, and $R_3$ have the same meaning as above, and in which $R_4$ is alkyl, phenyl, alkoxy, phenoxy or thioalkyl, wherein the alkyl, alkoxy and thialkyl groups can have from 1 to 20 carbon atoms; and $R_5$ is H, alkyl of 1 to 10 carbon atoms, methoxy or thiomethyl; oxazolidine spirobenzopyran compounds having the following formula:

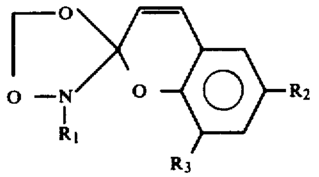

wherein $R_1$, $R_2$, and $R_3$ are as defined above; and thiazoline spirobenzopyran compounds of the following formula:

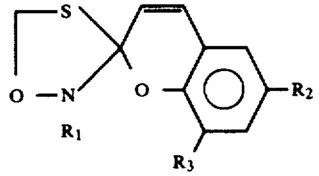

wherein $R_1$, $R_2$, and $R_3$ are as defined above.

The indolino-spirobenzopyran compounds and benzothiazole spirobenzopyran compounds are preferred.

The spiropyran compounds are all conventional and well known in the art and generally are prepared by condensation of an indoline-, benzothiazole, oxazolidine- or thiazoline base with a suitably substituted salicylic aldehyde. For instance, synthesis of the indoline spirobenzopyrans are described in U.S. Pat. No. 3,100,778 while synthesis of the benzothiazole spirobenzopyrans are described in French Pat. No. 2,105,021.

The binders in which the spiropyran compounds are uniformly dispersed are conventional vinyl chloride resin polymers containing from 50% to 100% by weight of vinyl chloride monomer units, preferably from 80 to 92% by weight of vinyl chloride monomer units. It was unexpectedly found that when these spiropyran compounds are dispersed in the vinyl chloride resin binders the corresponding merocyanine compound produced by irradiation of the spiropyran compound with a light source having a suitable wavelength remains stable against exposure to light, darkness, or heat. However, when the binder is a polyvinyl chloride copolymer it has surprisingly been found that it is not possible to permanently lock the spiropyran compound in its colored form, i.e. merocyanine compound, when the vinyl chloride monomer units constitute less than 50% by weight of the copolymer. Any monomer that can copolymerize with vinyl chloride monomer can be used to form the vinyl chloride copolymer resin binder. Suitable monomers include, but are not limited to, vinyl acetate, vinylidene chloride, maleic anhydride, etc. It is also possible to use two or more additional monomers which are copolymerizable with vinyl chloride. However, as previously noted, it is essential that at least 50% by weight of the total monomers and preferably 80 to 92% by weight is vinyl chloride.

The conversion of the spiropyran compounds to their colored form is effected by the action of ultraviolet radiation with a wavelength having an order of magnitude in the range of from about 2,000 Å to about 4,000 Å. This reaction can be accomplished in a few seconds, generally on the order from about 5 seconds to about 60 seconds depending on the type of lamp used and the distance between the lamp and the photosensitive recording element. The light source can be monochromatic or have a wide band of wavelength.

In the photosensitive compositions of the present invention the photochromic spiropyran compound and the binder are intimately mixed in an amount sufficient to provide from about 0.5 to 20%, preferably 2 to 10% by weight of the photochromic compound based upon the amount of binder.

The photosensitive compositions of the present invention can be prepared simply by dissolving the spiropyran compound in a solution of the binder. Any solvent for vinyl chloride base resins can be used. Examples of suitable solvents include ketones, esters, chlorinated solvents, tetrahydrofuran, etc.

In preparing the photosensitive recording materials according to the present invention the solution of the spiropyran and binder is applied to an appropriate support and dried in any conventional manner to thereby provide a layer of the spiropyran compound uniformly dispersed in the vinyl chloride resin binder. Any conventional support material may be used in the preparation of the photosensitive recording element. Thus, paper, plastic or even metallic supports can be utilized.

The photographic process utilizing the photochromic compositions of the present invention can produce positive or negative reproductions depending upon the type of original which is utilized. In general, the reproduction process of the present invention comprises the steps of placing the photosensitive recording material comprising the support and a layer of the photosensitive composition formed from the photochromic spiropyran compound uniformly dispersed in the resin binder beneath an original having at least one transparent area and thereafter imagewise exposing the photosensitive recording element through the transparent portion or portions of the original with ultraviolet radiation having a wavelength which will transform the spiropyran compound into the corresponding merocyanine compound. Generally, the light source should emit ultraviolet light whose magnitude is in the order of from about 2,000 Å to about 4,000 Å and the exposure should be for a period of from about 5 seconds to about 60 seconds. When the original is a transparency containing opaque image areas and transparent non-image areas a negative reproduction is obtained. On the other hand, if the original is in the form of a stencil, for example, wherein the image areas, which may be in the form of numbers, letters, lines, figures, dots, etc., are transparent then a positive reproduction is obtained. It is therefore apparent that an extremely simple dry reproduction process is obtained which does not require any additional developing steps. Moreover, the colored image which is formed by the process of the present invention remains stable over indefinite periods even when exposed to light, darkness, or heat.

The photosensitive compositions of the present invention have an additional advantage in that while the photochromic spiropyran compound is stablized in its colored form the spiropyran compound in the photosensitive compositions and recording element is not stabilized in its colorless form. Therefore, it is possible to superimpose a plurality of images on the same recording element at different times by re-exposing the photosensitive element through a second original in an imagewise manner. Even if there is an overlap in the transparent portions of the second original with respect to the transparent areas of the first original the originally produced colored images will not be effected by the subsequent exposure. However, the portions of the photosensitive recording element which were not previously exposed to the ultraviolet radiation will be transformed to the stable colored form.

This characteristic feature of the photosensitive compositions of the present invention can be utilized, for example, to allow the subsequent completion of documents already furnished with permanent data by addition of newly acquired information.

However, it is also apparent that this capability of the photosensitive compositions of the present invention can create certain drawbacks since the materials can inadvertantly be exposed to ultraviolet radiation containing the wavelength for transforming the spiropyran compounds to the merocyanine compounds and thereby partially or substantially cause the destruction of the usefulness of the previously exposed material. It is therefore suggested that the photosensitive recording materials be stored in a dark place prior to use.

It has been found, however, that this drawback can be eliminated by including polyvinylidene chloride in the photosensitive compositions and recording element. Again, the proportion of the photochromic spiropyran compound will be between 0.5 and 20%, preferably between 2 and 10% by weight of the total amount of the vinyl chloride resin and polyvinylidene chloride.

The photosensitive compositions of this second embodiment of the present invention can be prepared by dissolving the polyvinylidene chloride and vinyl chloride polymer or copolymer resin in a single solvent or in two distinct but mutually compatible solvents. The polyvinylidene chloride can constitute from between 20% to 80% by weight of the total binder. As the proportion of the polyvinylidene chloride in the binder increases the time of the first exposure to the ultraviolet light source, as explained in more detail below, decreases. However, the amount of the vinyl chloride resin in the binder must remain sufficiently high to stabilize the final colored image.

The solutions of the photochromic spiropyran compound and mixed binder can be prepared in several ways. For instance, when only a single solvent for both the vinyl chloride resin and the polyvinylidene chloride is employed, the photosensitive recording element is prepared by depositing the solution on a suitable support and dried as described above to form a layer of the photosensitive composition carried on the support.

It is also possible to disperse the spiropyran compound in an aqueous or aqueous alcohol dispersion or emulsion of polyvinylidene chloride. This dispersion or emulsion is then applied to the support and dried in any conventional manner and thereafter a solution of the vinyl chloride polymer or copolymer resin in a solvent which is also a solvent for the polyvinylidene chloride is deposited on the first layer to form an overlayer of the vinyl chloride resin. During the application of the vinyl chloride resin solution the solvent will penetrate through the polyvinylidene chloride layer so that the vinyl chloride resin can still effectively stabilize the final colored image, presumably by forming a complex with the merocyanine compound. This technique makes it possible to utilize the aqueous dispersions or emulsions of polyvinylidene chloride which are the current commercial forms of this product.

It is known that polyvinylidene chloride decomposes upon irradiation with ultraviolet actinic radiation of relatively short wavelength in the range of from about 1,600 Å to about 2,600 Å. Generally, the exposure requires from about 2 minutes to about 10 minutes depending upon the amount of the polyvinylidene chloride and the source of the ultraviolet radiation. The photodecomposition reaction of the polyvinylidene chloride to produce hydrochloric acid is a known reaction. The hydrochloric acid will form a pale stable yellow complex with the merocyanine produced by the irradiation of the spiropyran compound as generally described in U.S. Pat. No. 3,341,330 to Foris.

Accordingly, in the process of the present invention, according to this second embodiment, the photosensitive recording element comprised of the photochromic spiropyran compound uniformly dispersed in the vinyl chloride resin/polyvinylidene chloride binder layer or layers carried by a suitable support is placed under an original transparency containing opaque zones and transparent zones. The photosensitive recording material is then irradiated in an imagewise pattern through the original with ultraviolet radiation having a wavelength on the order of from about 1600 Å to about 2,600 Å, preferably 2,000 Å to 2,600 Å, for a period of from about 2 minutes to about 10 minutes to thereby produce hydrochloric acid by the decomposition of polyvinylidene chloride. The hydrochloric acid will react with the merocyanine formed in the irradiated zones to produce a pale stable yellow complex in the irradiated zones of the photosensitive recording element.

After the original exposure, the transparency is withdrawn and the entire photosensitive recording material is subjected to a second irradiation with ultraviolet light having a wavelength on the order of from about 2,000 Å to about 4,000 Å for a period of from about 5 seconds to 1 minute to thereby form a stable colored complex between the merocyanine formed from the photoisomerization of the spiropyran compound and the vinyl chloride resin binder in the areas corresponding to the opaque areas of the original. Accordingly, the process of the present invention provides a strongly colored stable positive reproduction on a pale yellow background. This positive reproduction does not require any subsequent development steps and the product is a highly legible, contrasting colored stable document which will not be altered upon exposure to light, darkness, or heat, including ultraviolet radiation.

In carrying out this process it is necessary that the original irradiation step be for a sufficient amount of time to decompose the polyvinylidene chloride in the irradiated zones. As the proportion of the polyvinylidene chloride binder increases the length of time necessary to effect the decomposition is correspondingly reduced. On the other hand, the proportion of vinyl chloride polymer or copolymer in the binder must remain sufficiently high to produce the stable colored complex of the merocyanine which is the main object of the compositions and process of the present invention.

As previously indicated the wavelength that triggers the decomposition of the polyvinylidene chloride is preferably between 1,600 Å and 2,600 Å. The wavelength that triggers the transformation of the spiropyrans into merocyanines is between about 2,000 Å and about 4,000 Å. Therefore, in carrying out the process of the present invention which requires two separate irradiations it is nevertheless possible to use a single source for the ultraviolet radiation which emits radiation having a wavelength on the order of between about 2,000 Å and 2,600 Å. However, when a single light source is utilized the second irradiation should be for as short a time as possible in order to avoid any partial decomposition of the polyvinylidene chloride along with the formation of the merocyanine which forms the colored images.

If two different light sources or a single light source and separate light filters are used for the first and second irradiation steps it is possible to substantially reduce the duration of the first irradiation step by selecting a light source emitting radiation substantially lower than 2,500 Å and decreasing the amount of the polyvinylidene chloride. The second irradiation can then be with ultraviolet light having a wavelength of greater than 2,600 Å. In this mode of operation it is not required to minimize the length of time for the second irradiation since there will be no problem of the photodecomposition of the polyvinylidene chloride at these higher wavelengths.

Each of the previously described first and second embodiments of the processes of the present invention require only irradiation with actinic light having suitable wavelengths to form the photographic prints.

It has now been found that a photothermal recording process can be utilized by making minor adjustments to the photosensitive compositions and photosensitive recording elements previously described. Specifically, it has been found that by incorporating at least one of hydrolyzed polyvinyl alcohol, hydroxyethyl cellulose, or carboxymethyl cellulose in the polyvinyl chloride binder the photochromic properties of the spiropyran compounds are inhibited although this activity can be restored by thermal means such as a heating head or heated stylus. After the transformation of the photochromic spiropyran compound is initiated by the application of heat the transformation is amplified and stabilized by the subsequent irradiation with ultraviolet light.

Accordingly, in a third embodiment of the photosensitive compositions of the present invention the photochromic spiropyran compound is uniformly dispersed in the vinyl chloride resin binder to which is added from 30 to 50% by weight of at least one member selected from the group consisting of polyvinyl alcohol which has been hydrolyzed to an extent of at least 70 mole percent, hydroxyethyl cellulose and carboxymethyl cellulose.

These photothermal sensitive compositions are prepared by dissolving the polyvinyl alcohol, hydroxyethyl cellulose, or carboxymethyl cellulose in water and forming a dispersion of the photochromic spiropyran compound and the vinyl chloride resin binder in the aqueous solution in an amount sufficient to provide from 0.5 to 20% by weight, and preferably from 2 to 10% by weight, of the total weight of the binder, of the photochromic spiropyran compound and at least 50% by weight of the total binder of the vinyl chloride homopolymer or copolymer. Again, it is essential that the amount of the vinyl chloride units constitute at least 50% by weight of the total binder in order to assure the permanent stability of the colored image.

The photothermal recording elements according to this embodiment of the present invention are prepared by applying the aqueous dispersion containing the spiropyran compound, binder, and polyvinyl alcohol, hydroxyethyl cellulose, or carboxymethyl cellulose to a suitable support e.g. paper, plastic, or metal sheet, etc. and thereafter drying the sheet in any conventional manner.

The photothermal recording process utilizing the photosensitive recording element of this embodiment of the present invention can be utilized to directly provide a positive line image by using a heating head or heated stylus or any other suitable means for applying thermal energy to trace directly on the photosensitive recording element the image to be printed. The temperature of the thermal energy application means must be sufficient to raise the temperature of the photosensitive composition to at least 120° C. and preferably 150° C. The thermal energy application on the photosensitive recording elements generates a very lightly colored mark which is thereafter intensified and permanently fixed by the application of ultraviolet radiation using a light source which emits waves having a wavelength between 2,000 Å and 4,000 Å for a period of from about 5 seconds to about 60 seconds. Since the photochromic spiropyran compound is dispersed in an aqueous medium this brief irradiation does not cause its transformation to merocyanine in the areas which have not been subjected to the thermal energy treatment.

This embodiment of the present invention has several advantages. The presence of the strongly hydrolyzed polyvinyl alcohol, hydroxyethyl cellulose, or carboxymethyl cellulose in the photochromic composition renders the composition and photosensitive recording material encompassing the same sufficiently stable to impart it with a long shelf life. The colored markings have very strong contrast and are permanent. Moreover, it is possible to apply additional entries at a later time by repeating the heating and irradiation steps.

The present invention in its various embodiments will now be described by the following examples which will serve to further illustrate the nature of this invention and should not be construed as a limitation thereof.

EXAMPLE 1

In 100 grams chloroform, there are dissolved 10 grams polyvinyl chloride (Genclor S, Imperial Chemical Industries Ltd) and 0.2 grams 1-isopropyl-3,3-dimethyl-6'-nitro-8'-methoxyspiro-(2H-1 benzypyran-2,2'-indoline).

This solution is laid on paper in a proportion of 5 grams to the square meter, and dried.

Using a Phillips HP 125 lamp that emits radiation of the order of 3660 Å, placed about 10 cm from the photosensitive recording material thus prepared, the material is irradiated for about 30 seconds through a negative. A dark blue image of the original is obtained that is perfectly stable in time.

By means of another irradiation, a new image can be produced in the clear zones of the obtained document.

EXAMPLE 2

In 100 grams acetone, there is similarly dissolved 10 grams of a copolymer of vinyl chloride, vinyl acetate and maleic acid with 85% vinyl chloride (Rhodopas AXCM, Rhone-Poulenc Company) as well as 1 gram 3-methyl-3',8'-dimethoxy-6'-nitrospiro-(1-benzopyran-2,2'-benzothiazole).

Following the same procedure as in example 1, a stable violet image is produced.

EXAMPLE 3

In 100 grams methyl ethyl ketone, there is dissolved 10 grams of a copolymer comprising 83% vinyl chloride (Rhodopas ACVX, Rhone-Poulenc Company) and 0.5 grams 1-phenyl-3,3-dimethyl-6'-nitro-8'-methoxy spiro-(2H-1 benzopyran-2,2'-indoline).

Following the same procedure as in example 1, a blue green image is obtained that is perfectly stable with time.

EXAMPLE 4

Using the same process as in the above example, but replacing the Rhodopas ACVX by a copolymer with 91% vinyl chloride (Rhodopas AXRH Rhone-Poulene Company) to which there is added 0.5 gram 1,3,3-trimethyl-6'-nitro-8'-methoxy spiro-(2H-1 benzopyran-2,2'-indoline) a time-stable image is obtained which is dark blue.

EXAMPLE 5

This example and the following one illustrate an embodiment of the process according to the second embodiment described above.

An aqueous dispersion of commercial polyvinylidene chloride (Diofan, German Company B.A.S.F.) is diluted with water to 100 cc, and in it there is dispersed by means of a ball grinder 0.5 grams 1-isopropyl-3,3-dimethyl-6'-nitro-8'-methoxy spiro [2H-1 benzopyran-2,2'-indoline], and this dispersion is laid on a paper support.

There is next prepared a solution of 10 grams of a copolymer of vinyl chloride, vinyl acetate and maleic acid with 85% vinyl chloride (Rhodopas AXCM) in 100 cc acetone, which is deposited on the previous layer, to obtain a proportion of 75% dry materials of the first composition to 25% of the second.

After drying, the material thus prepared is irradiated for 2 minutes through an original that is constituted by apertures cut in an opaque sheet, the luminous source emitting radiation of wavelength 2540 Å. The apertures appear in pale yellow on a colorless background.

Once the apertured mask has been removed, the document thus imprinted is irradiated for 5 seconds under a source that emits radiations of wavelength 3660 Å. The zones masked in the first irradiation come out intense blue, on which there are distinguished in pale yellow the zones that correspond to the apertures of the opaque original.

A Phillips UVS 69 lamp was used as the light source for both exposures but a filter passing light of wavelength 2540 Å was used for the first exposure and a filter passing light of 3660 Å was used for the second irradiation.

Both pale and dark zones of the document thus obtained remain perfectly stable in time and cannot be changed by a repetition of the described operations.

EXAMPLE 6

A 10% solution in tetrahydrofuran is prepared, of a copolymer of vinyl chloride, vinyl acetate and vinyl alcohol, with 91% vinyl chloride (Rhodopas AXRH).

In the same way, a 10% solution in tetrahydrofuran is prepared, of vinylidene chloride (Ixan E4, Solvay Co.). A mixture of 5 cc of each solution is prepared, and there is added 0.1 gram 1-cyclohexyl-3,3-dimethyl-6'-nitro-8'-methoxy spiro (2H-1 benzopyran-2,2'-indoline). This solution is applied to paper and dried.

With a procedure as in example 5, a dark blue image on a yellow background is obtained.

The following examples illustrate the third embodiment of the invention.

EXAMPLE 7

There is very homogeneously dispersed in 100 cc water:

10 grams 73% hydrolyzed polyvinyl alcohol (mole) (Rhodoviol 5/270 P, Rhone-Poulenc co.)

10 grams of a copolymer of vinyl chloride, vinyl acetate and maleic acid, with 85% vinyl chloride (Rhodopas AXCM, Rhone-Poulenc)

0.5 grams 1-cyclohexyl-3,3-dimethyl-6'-nitro-8'-methoxy spiro (2H-1 benzopyran-2,2'-indoline).

This composition is deposited on a sheet of ordinary paper, in a proportion of 10 grams to the square meter, and dried.

On the sheet thus prepared, inscriptions are traced by means of a heating head at 150° C., the said inscriptions appearing on top, with the appearance of low-intensity greenish blue lines. The sheet is then exposed for a few seconds to the action of a source of ultraviolet radiation, wavelength 3660 Å. The inscriptions then become intensely violet in color and remain so irreversibly.

EXAMPLE 8

The same procedure was used as in example 7, replacing the Rhodoviol 5/270 P with Rhodoviol 4/20 (98% hydrolyzed) and replacing Rhodopas AXCM 1 by Rhodopas AXRH.

In this case there is produced a perfectly stable violet tracing.

EXAMPLE 9

In a Dangouneau mixer, there are introduced the following components, which are dispersed very homogeneously:

100 cc water 10 grams hydroxyethyl cellulose (Natrosol L250, Hercules Powder Co.)

10 grams of a vinyl copolymer, with 83% PVC (Rhodopas ACVX, Rhone-Poulenc).

1 gram 1,3,3-trimethyl-6'-nitro spiro (2H, 1 benzopyran-2,2'-indoline).

With the procedure of the former example, a violet red tracing is produced.

EXAMPLE 10

Results equivalent to those of example 9 are obtained by replacing Natrosol L250 with carboxymethyl cellulose (Blanose R105, Novacel Co.) and replacing the Rhodopas ACVX with Rhodopas AXCM.

EXAMPLE 11

With use of a ball mixer, there are very homogeneously dispersed:

10 grams 89% hydrolyzed polyvinyl alcohol (Rhodoviol 4/125, Rhone-Poulenc)

10 grams polyvinyl acetochloride, 82% PVC (Rhodopas AXBM, Rhone-Poulenc)

2 grams 3-methyl-3',8'-dimethoxy-6'-nitro spiro (1-benzopyran-2,2'-benzothiazole).

This composition is laid on paper by means of a Meyer rule and then dried.

A blue green trace is obtained by inscription with use of a thermal head at 160°, followed by a brief exposure to UV radiations, wavelength 3660 Å.

COMPARATIVE EXAMPLE

Following the same procedure as in example 1 except that the polyvinyl chloride is replaced by polyvinyl acetate (Movolith 50 of Hoescht A.G. Co.) a deep blue image is obtained which disappears after about 4 hours.

Having described the invention in detail it will be apparent to those skilled in the art that certain variations and modifications may be made without departing from the spirit and scope of the invention as described herein or in the appended claims.

I claim:

1. A thermosensitive composition capable of producing a colored image by application of thermal energy comprising solid particles of a normally photochromic spiropyran compound uniformly dispersed in a resin binder comprising a vinyl chloride resin selected from the group consisting of polyvinyl chloride homopolymer and a vinyl chloride copolymer containing at least 50 percent, by weight, of vinyl chloride units, and from about 30 percent to about 50 percent by weight of the resin binder of at least one member selected from the group consisting of polyvinyl alcohol having a degree of hydrolysis of at least 70 mol percent, hydroxylethyl cellulose and carboxymethyl cellulose, whereby application of sufficient thermal energy to said composition converts the normally photochromic spiropyran compound to a photosensitive state which upon exposure to radiation having a wavelength in the range of between about 2,000 Å to about 4,000 Å is converted into a colored form which is stable against further exposure to light, darkness and heat, said spiropyran compound being selected from the group consisting of indoline spirobenzopyran compounds of formula (I):

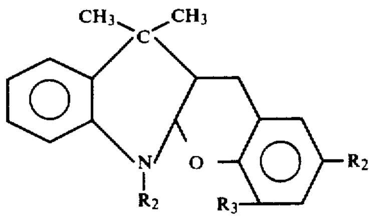

(I)

in which $R_1$ is an alkyl group of 1 to 10 carbon atoms or a phenyl group;

$R_2$ is H, OH, Cl, Br, $NO_2$, methoxy or ethoxy; and $R_3$ is H, Cl, Br, $NO_2$, methoxy or ethoxy;

benzothiazole spirobenzopyran compounds having the following formula (II):

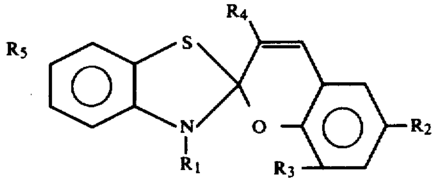

(II)

in which $R_1$, $R_2$ and $R_3$ have the same meaning as above, and in which $R_4$ in alkyl, phenyl, alkoxy, phenoxy or thioalkyl, wherein the alkyl, alkoxy and thioalkyl groups have from 1 to 20 carbon atoms; and $R_5$ is H, alkyl of 1 to 10 carbon atoms, methoxy, or thiomethyl; oxazolidine spirobenzopyran compounds having the following formula (III):

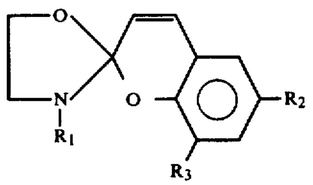

(III)

wherein $R_1$, $R_2$ and $R_3$ are as defined above; and thiazoline spirobenzopyran compounds of the following formula (IV):

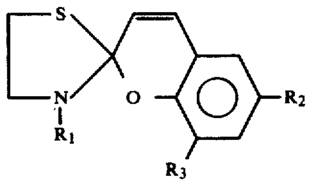

(IV)

wherein $R_1$, $R_2$ and $R_3$ are as defined above.

2. The composition of claim 1 in which the solid particles of the photochromic spiropyran compound and the resin binder are intimately mixed in an amount sufficient to provide from about 0.5 to 20% by weight of the spiropyran compound based upon the amount of binder.

3. The composition of claim 1 in which the photochromic spiropyran compound is an indoline spirobenzopyran of formula (I).

4. The composition of claim 1 in which the photochromic spiropyran compound is a benzothiazole spirobenzopyran of formula (II).

5. The composition of claim 1 in which the photochromic spiropyran compound is an oxazolidine spirobenzopyran of formula (III).

6. The composition of claim 1 in which the photochromic spiropyran compound is a thiazoline spirobenzopyran of formula (IV).

7. In a thermosensitive recording element including a support and a layer of a thermosensitive composition carried by said support, the improvement comprising, as said thermosensitive composition, the composition of claim 1.

8. A photothermal reproduction process which comprises applying thermal energy according to a predetermined pattern, to the thermosensitive recording element of claim 7 until the temperature of said photosensitive recording element reaches at least 120° C. in areas corresponding to said predetermined pattern and thereafter exposing said thermosensitive recording element to ultraviolet radiation having a wavelength in the range of about 2,000 Å to about 4,000 Å whereby a permanent stable colored image corresponding to said predetermined pattern is obtained on said thermosensitive recording element.

9. The process of claim 8 wherein the temperature of said thermosensitive element is raised to at least 150° C. by said thermal energy application.

* * * * *